United States Patent [19]

Bläuenstein

[11] 4,366,945
[45] Jan. 4, 1983

[54] HOSE COUPLING WITH DOUBLE LOCK

[75] Inventor: Arnold Bläuenstein, Cham, Switzerland

[73] Assignee: Abnox AG, Switzerland

[21] Appl. No.: 201,482

[22] PCT Filed: Dec. 11, 1979

[86] PCT No.: PCT/CH79/00158
§ 371 Date: Aug. 20, 1980
§ 102(e) Date: Aug. 14, 1980

[87] PCT Pub. No.: WO80/01311
PCT Pub. Date: Jun. 26, 1980

[30] Foreign Application Priority Data

Dec. 20, 1978 [CH] Switzerland ............ 12963/78

[51] Int. Cl.³ ............................................. F16L 37/28
[52] U.S. Cl. ................................ 251/149.6; 285/316; 285/DIG. 25
[58] Field of Search ............ 251/149.6; 285/DIG. 25, 285/277, 316

[56] References Cited

U.S. PATENT DOCUMENTS 2,905,485 9/1959 Zajac .................................. 251/149.6
4,060,219 11/1977 Crawford ........................... 251/149.6

FOREIGN PATENT DOCUMENTS 2304796 8/1974 Fed. Rep. of Germany ...... 285/316
109393 4/1964 Netherlands ........................ 285/316

Primary Examiner—A. Michael Chambers
Attorney, Agent, or Firm—McGlew and Tuttle

[57] ABSTRACT

The pipe-coupling comprises a socket member adapted to receive a nipple for connecting a compressed air hose to a fixed supply conduit, for example. The nipple can be inserted manually without any additional actuation of the socket member, since locking is effected by spring-loaded locking members which engage in a circumferential groove in the nipple. When the nipple is fully engaged, a valve arranged in the socket member is open, counter to the pressure of a spring. Release of the coupling is effected by two sliding movements, in opposite directions, of a sliding sleeve enclosing the socket member, the first sliding movement releasing the spring-loaded locking members and the second sliding movement releasing further locking members. Between the two unlocking stages, the nipple executes a short axial movement which results in closure of the valve and release of the compressed air present in the hose, so that after the further locking means have been released, the hose with nipple can be removed from the socket member without any danger. A resilient latch member prevents accidental movement of the sliding sleeve back and forth.

8 Claims, 5 Drawing Figures

HOSE COUPLING WITH DOUBLE LOCK

The invention relates to a pipe-coupling for forming a connection between a socket-member and a nipple which can be inserted into the socket member, and having a valve arranged in the socket-member which closes automatically upon uncoupling, and at least one spring-loaded locking element arranged in the socket-member, which locking element engages in a circumferential groove of the nipple and is movable into an unlocked position by an external sliding sleeve on the socket-member.

A pipe-coupling of this kind is known from Swiss patent specification No. 323097. When the nipple is pushed in, that is to say, when coupling is effected, the spring-loaded locking element is depressed by a forward part of the nipple and then engages in the circumferential groove of the nipple under the pressure of a spring-element. In this case, displacement of the sleeve is not necessary, so that the nipple can be engaged with the socket-member in a particularly simple manner. However, displacement of the sleeve allows the locking element to move out of its engaged position in the circumferential groove, so that the coupling is released. The valve provided in the socket-member then closes immediately and the connection with the source of pressure e.g. the compressed air source, is interrupted. However, since there will still be air under pressure in the hose which is usually connected to the nipple, the danger exists that the hose and the nipple with it, will be flung away from the socket-member in an uncontrolled movement, under the effect of the air-pressure and the escaping air, and that someone will be injured. In order to avoid this difficulty, a pipe-coupling is already known in which uncoupling is effected by displacement of the external sleeve in two stages, so that between these two stages, compressed air trapped in the hose which carries the nipple and which is to be disconnected, can be released. However, this pipe-coupling has the disadvantages that the nipple can only be inserted after the sleeve has previously been actuated and one of the release-movements of the sleeve can already take place under the pressure of a spring, so that inadvertent uncoupling can take place due to the sleeve being hit.

SUMMARY OF THE INVENTION

The above mentioned disadvantages of the known pipe-couplings are avoided by a pipe-coupling in accordance with the invention, having the features of the claims.

The invention will now be described in greater detail with reference to the embodiments shown by way of example in the drawings.

DESCRIPTION OF THE PREFERRED EMBODIMENTS

Figure 1:
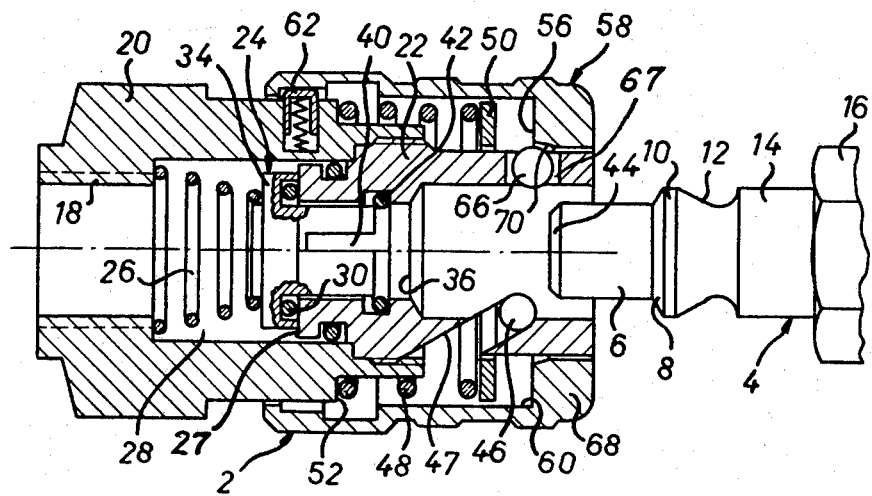
FIG. 1 is an axial longitudinal section through a pipe-coupling taken on two planes at an angle of 90°, along the lines II—II of FIG. 2, showing the situation before insertion of the nipple.

The pipe-coupling of the invention serves for connecting two pipe-members which are not shown, one of which may for example be fixedly mounted and has a socket-member 2 fitted thereto, while the other pipe-member which is usually in the form of a hose, has a nipple 4 at its end. The nipple 4, which is only partly shown, has at its end which is not visible, a part which receives the hose-end and which may be in the form of, for example, a threaded connector. The form of the nipple corresponds to that of the nipples of known pipe-couplings, so that it is possible to couple hoses provided with nipples of the type customary hitherto, with a pipe-member fitted to the socket-member 2. This nipple has at its forward end, a cylindrical plug-portion 6 which is connected at its rear end, by way of a conical surface 8, with a projecting portion 10 which leads into a circumferential groove 12. A second cylindrical portion 14 of greater diameter is then connected with a hexagonal head 16. An axial bore, which is not visible in the drawing, extends through the nipple and serves for conveying the medium flowing through the tubular conduit.

Figure 3:
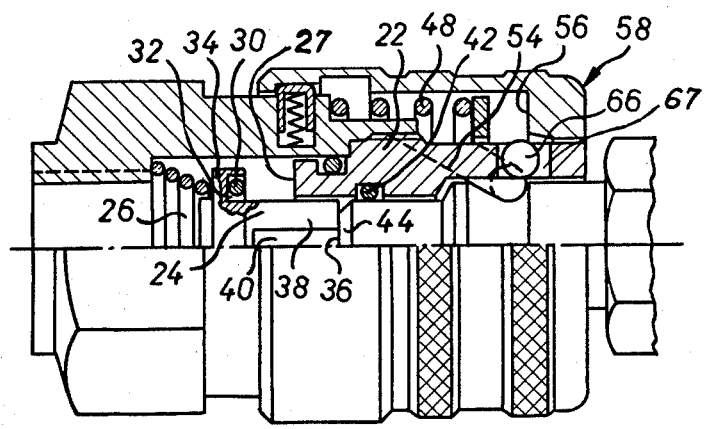
FIG. 3 shows the pipe-coupling of FIG. 1 in the coupled condition, partly in longitudinal axial section and partly in side view.

The socket-member includes a hollow cylindrical socket-body 20 which is provided with an internal connecting thread 18. A hollow cylindrical coupling-body 22 is screwed into the end of the socket-body 20 opposite to the connecting thread 18. An O-ring provides fluid-tightness between the two bodies 20, 22. A valve-member 24 having a closing spring 26 is located between the socket-body 20 and the coupling-body 22. A corresponding cylindrical space 28 is provided between the surface 27 at the end of the coupling-body 22 and the socket-body 20, which space allows for extension of the spring 26 and stroke-movement of the valve-member 24. Comparison with FIG. 3 shows the other extreme position of the valve-member 24. Fluid-tightness is achieved by means of O-ring 30 which is trapped in a groove 32 formed in the part 34 of the valve-member. The closing spring 26 bears against this part 34. By virtue of the pressure of the spring 26 and the pressure of the medium to be controlled, the O-ring 30 of the valve-member bears against the radial surface 27 of the coupling-body 22.

When the nipple 4 is inserted into the socket-member 2, the end-face 36 of the nipple bears against the end-face of an extension 38 of the valve-member 24 and moves the valve-member against the pressure of the closing spring 26, into the position shown in FIG. 3 in which the valve is fully open. The medium can then flow through the turns of the spring 26, around the part 34 of the valve-member and through slots 40 in the extension 38 of the valve-member and reaches the inlet opening in the end-face 36 of the nipple 4.

In order to provide sealing between the coupling-body 22 and the nipple 4, a further O-ring 42 is located in an internal circumferential groove in the coupling-body 22, which in the coupled condition of the pipe-coupling bears against the cylindrical surface of the plug-portion 6 of the nipple. Movement of the plug-portion 6 into the O-ring 42 is facilitated by a bevel 44 at the forward end of the nipple.

Two cylindrical pins 46 which engage in the circumferential groove 12 of the nipple serve for locking the nipple in the socket-member 2. As can be seen from FIGS. 1 and 2, the cylindrical pins 46 are slidable parallel to one another and diametrically opposite one another in inclined slots 47 in the coupling-body 22. Movement of the cylindrical pins 46 takes place against the pressure of a coil-spring 48 which bears, under compression, on the one hand against an annular disc 50 which is slidable axially relatively to the socket-member and on the other hand against a shoulder 52 on the socket-body 20. In this way the pressure of the spring is applied to the cylindrical pins 46 by way of the annular disc 50. The circumferential groove 12 is shaped so as to match the inclination of the inclined guide-slots 47, so that the cylindrical pins 46 can engage in the hollowed-out groove under the pressure of the spring. In this way, a guide-path is provided for the cylindrical pins, which is indicated in FIG. 3 by dotted lines 54. It should be borne in mind that the guide-groove 47 is in fact displaced through an angle of 90° in the circumferential direction, relatively to the position shown in the drawings. When the nipple is inserted, the parts of the cylindrical pins which are visible in FIG. 2 slide over the conical surface 8 and the projecting portion 10 of the nipple, into the groove 12, the spring 48 meanwhile being somewhat compressed. Against the side of the cylindrical pins 46 opposite the side which is directed towards the annular disc 50, there bears a radially extending internal surface 56 of a sleeve 58 which encloses the hollow cylindrical coupling-body 22 and a part of the socket-body 20. By sliding the sleeve towards the socket-body 20, that is to say towards the left in the drawings, the cylindrical pins are enabled to slide out of the groove 12 of the nipple, along the inclined slots 47, when it is desired to release the locking action. Movement of the cylindrical pins 46 in their longitudinal direction is prevented by the cylindrical internal surface 60 of the sleeve 58.

Figure 4:
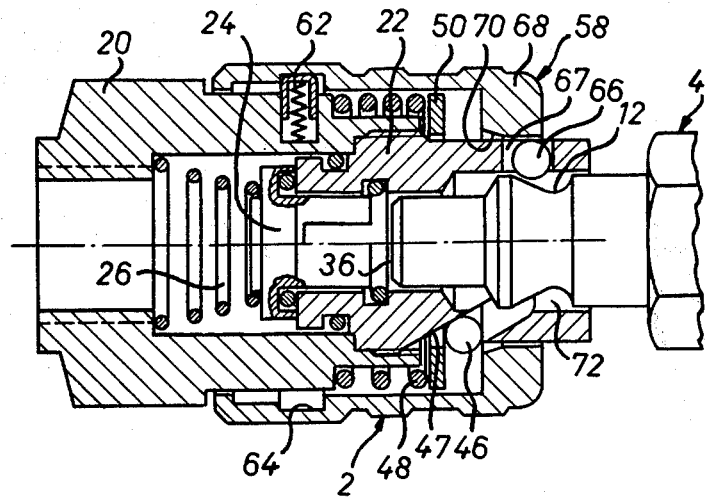
FIG. 4 is a longitudinal axial section taken on two planes at an angle of 90°, showing the pipe-coupling in a partially uncoupled condition.

FIG. 4 shows the position of the nipple relatively to the coupling-body 22, after the locking of the nipple by means of the cylindrical pins 46 has been released, by sliding the sleeve 58 towards the left in the manner referred to above. The sleeve is arrested in its end-position by engagement of a spring-loaded latch-element 62 in a shallow circumferential internal groove 64 in the sleeve 58. By sliding movement of the sleeve 58 towards the left, two locking elements 66 which may be in the form of balls, for example, are moved radially inwardly in the space 67 of the coupling-body 22 by a conical surface 70 of sleeve 58, in which they are engaged so that they project partially into the cylindrical space 72 within the coupling body 22 and thus, by engaging in the circumferential groove 12 of the nipple 4, they prevent further outward movement of the nipple. The ball-shaped locking elements 66 are prevented from dropping inwardly into the space 72, when there is no nipple inserted into the socket-member 2, by virtue of the fact that the axially extending side-walls of the space 67 extend radially inwardly relatively to one another and have a spacing from one another at the inside edges of this space 67, which is smaller than the diameter of the ball-shaped locking elements 66.

In order to control the inward radial movement of the locking elements 66, the slightly conical control-surface 70 is provided on the inside of the end-wall 68 of the sleeve which, during sliding movement of the sleeve, moves past the ball-shaped locking elements 66 and thus presses these inwardly. The cylindrical surface which follows the conical surface 70 then holds the locking elements 66 in their inner radial position as shown in FIG. 4. As can be seen from FIG. 2, the parts of the cylindrical pins 46 which enter into engagement with the circumferential groove 12 of the nipple 4 and the locking elements 66 are displaced through an angle of 90° relatively to one another and their relative axial positions are indicated in FIG. 3 by showing one of the cylindrical pins 46 in dotted lines. Comparison of FIGS. 3 and 4 also shows that the two locking positions of the nipple 4 in the socket-member, defined by the cylindrical pins 46 and the locking elements 66, follow one another with a relatively small axial spacing between them so that the nipple 4, and especially the circumferential groove 12 thereof, can be made to be particularly short in the axial direction, as with pipe-couplings customary hitherto which do not have two-stage uncoupling.

After the locking of the nipple by means of the cylindrical pins has been released in the manner described, the nipple 4 can then move a certain distance out of the socket-member into the position shown in FIG. 4, under the action of the closure spring 26 and under the pressure of the medium conveyed in the conduit, and then reaches a second position of locking engagement with the locking elements 66. In this position the pressure in the hose attached to the nipple 4 can be relieved since outflow is possible along the space between the internal surface of the coupling body 22 and the nipple 4.

Figure 2:
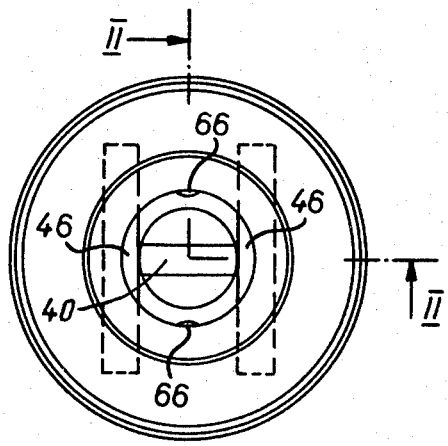
FIG. 2 is an elevational view of the socket-member of the coupling, taken from the side at which the nipple is inserted.

In order to be able to release the coupling completely and to withdraw the nipple 4 completely out of the socket-member 2, it is necessary to move the sleeve 58 away from the socket-body 20 again, that is to say towards the right in the drawings, into the position shown in FIG. 1. In this position, the ball-shaped locking elements 66 are no longer restrained by the inner surface of the end-wall 68 of the sleeve and can be pushed radially outwards by the conical surface of the circumferential groove 12 of the nipple, into a release position. The movement of the sleeve 58 towards the right cannot take place automatically under the pressure of the coil spring 48 acting on the end-wall 68 of the sleeve by way of the annular disc 50 and the cylindrical pins 46, since a greater pressure is necessary for this which has to be exerted manually, in order to overcome the locking effect of the spring-loaded latch-element 62. This ensures that the pipe-coupling cannot be uncoupled inadvertently, even if the first locking action by means of the cylindrical pins 46 is released by a blow on the sleeve 58.

It is to be understood that the manner of operation referred to can be achieved even with many modifications of the constructional form described. For example, the spring-loaded cylindrical pins, the ball-shaped locking elements 66 or the spring-loaded latch element 62 can be replaced by different but nevertheless equivalent means such as, for example, pawls and like elements. Also, the resilient elements in the form of coil springs can be replaced by other means having a resilient action such as, for example, rubber elements, leaf springs and the like. However, it is particularly important for the locking elements 46,66 to be arranged close to one another so that despite the compact and simple construction, reliable operation is achieved when using a nipple of conventional form.

Figure 5:
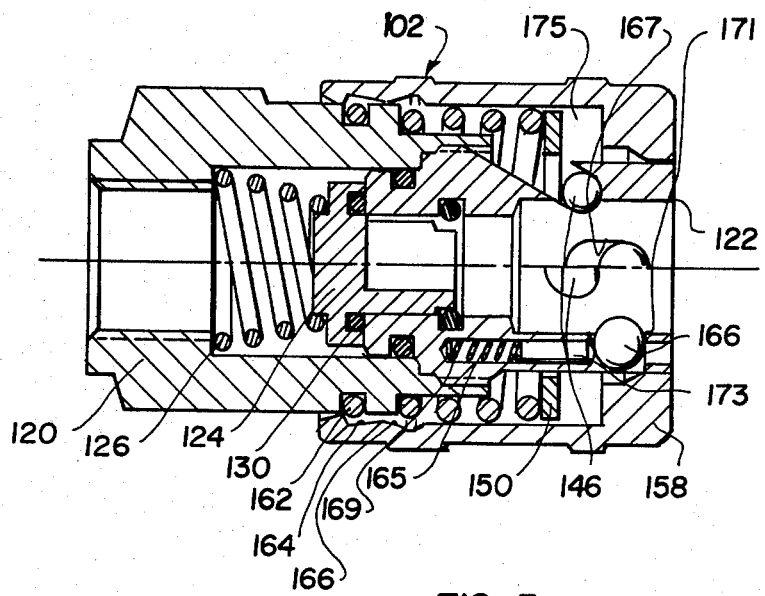
FIG. 5 is a longitudinal axial section taken on two planes at an angle of 90°, showing a pipe-coupling in accordance with a second embodiment.

In the second embodiment shown in FIG. 5, the spring-loaded latch-element 62 of the first embodiment is replaced by a radially resilient ring 162 consisting of a steel wire of circular cross-section having a small gap at one position. When pressure is exerted radially inwardly on the resilient ring 162 by pushing one or the other of two oppositely inclined internal surfaces 164,166 over the resilient ring 162 by displacement of the sleeve 158, the resilient ring 162 can yield radially inwardly, a gap in the resilient ring, which is not visible in the drawing, meanwhile being correspondingly narrowed.

In FIG. 5, those parts which correspond to parts in the first embodiment of FIGS. 1 to 4 are identified by reference numerals increased by 100 and it is therefore unnecessary to repeat the description of those parts.

In this second embodiment, the two ball-shaped locking elements 166 are pressed in the direction towards the outward axial end 171 of the space 167, by a compression spring 165 acting in the axial direction relatively to the socket-member 102, which reliably ensures that the ball-shaped locking elements 166 cannot move radially outwardly into the internal space 175 of the sleeve 158 and thereby become ineffective. This danger exists in particular, if the socket-member 102 is held or mounted with its opening directed upwardly. Under the action of resilient movement of the spring 169, the ball-shaped locking element 166 can nevertheless move in an inclined direction outwardly away from the projection 10 of the nipple (FIG. 1) when the nipple is inserted, resulting in contact with the conical surface 8 of the nipple, and can then return in the axial direction into the initial position at the outer end 171 of the cage-space 167. This spring-loading of the locking element eliminates the possibility of failure due to the parts being dirty.

The spring 165 is arranged in an axially extending bore in the coupling body 122, together with a cylindrical pin 173 which bears eccentrically on the spherical surface of the locking element 166, so as to give rise to a component of force on the locking element 166 directed radially inwardly.

I claim:

1. A pipe-coupling comprising: a socket member adapted to receive a nipple having a circumferential groove; a valve arranged in the socket-member, the socket-member having an external sliding sleeve which encloses a hollow cylindrical coupling body having a cage and an inclined channel; at least one spring and spring-loaded first locking element guided within the inclined channel of the coupling body, which first locking element engages in a locked position in the circumferential groove of the nipple and is movable out of said locked position against the action of said spring by axial movement of said external sliding sleeve, into an unlocked position, at least one second locking element which is arranged in the cage of the coupling body and which engages in the circumferential groove of the nipple in a locked position, and which is in contact with the sleeve when the sleeve is in an axial position which corresponds to the unlocked position of the first locking element, the locked positions of the first and second locking elements being at a distance from one another in an axial direction of the socket-member, so that a nipple inserted into the socket-member has two spaced locked positions relative to the socket-member, the valve being closed when the second locking element is engaged in its locked position; the pipe-coupling further comprising a resilient latch-element movably mounted to the socket-member, which in a latched position thereof engages the sliding sleeve in a displaced position of the sleeve in which the second locking element is in its locked position and is located for engagement in the circumferential groove of the nipple which is inserted into the socket-member.

2. A pipe-coupling according to claim 1, wherein the resilient latch-element serves as a stop for retaining the sleeve in all its positions on the socket-member, the sleeve being in a stop-position when the at least one first spring-loaded locking element is located in a radially inward position relatively to the socket-member which corresponds to the locked position thereof and of the pipe-coupling.

3. A pipe-coupling according to claim 1, wherein the latch-element comprises a radially resilient ring formed of a steel wire having a small gap therein at one circumferential location thereof.

4. A pipe-coupling according to claim 1, wherein two of said spring-loaded first locking elements are provided which are cylindrical and which are each guided in a separate inclined channel of said coupling body, each channel formed by a slot extending at an angle to a longitudinal axis of the socket-member, ends of said first locking elements being held between the spring which loads the first locking element and a part of the external sleeve and wherein the nipple has a conical surface which forms part of the circumferential groove thereof.

5. A pipe-coupling according to claim 4, wherein said at least one second locking element is ball-shaped and is arranged in relation to the circumferential direction of the hollow cylindrical coupling body between said two spring-loaded first locking elements, the cage of the coupling body receiving said second locking element being longer than a diameter of said ball-shaped second locking element.

6. A pipe-coupling according to claim 5, including biasing means engaged with said at least one second ball-shaped locking element having a compression spring biasing said ball-shaped locking element in the direction toward an axial end of said cage.

7. A pipe-coupling according to claim 6, wherein said biasing means comprise the coupling body having a bore provided which communicates with the cage and extends in the axial direction of the socket-member, in which bore the compression spring in the form of a coil spring is arranged, an axially displaceable cylindrical pin arranged between the coil spring and the second ball-shaped locking element.

8. A pipe-coupling according to claim 7, wherein the point of contact between said cylindrical pin and the second ball-shaped locking element is located radially outwardly relative to a midpoint of the ball-shaped locking element in the radial direction relatively to the socket-member, so that by virtue of the biasing of the second locking element, an inwardly directed radial force-component is exerted on the ball-shaped locking element.

* * * * *